Jan. 13, 1942.          C. E. BRANICK          2,269,969
SCALE
Filed Jan. 5, 1939          2 Sheets-Sheet 1

Inventor
Charles E. Branick

By Howard Fischer
Attorney

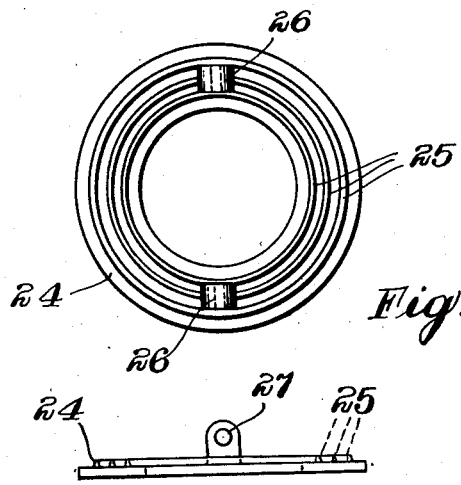
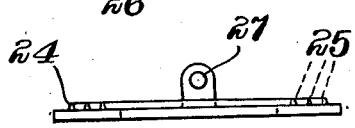
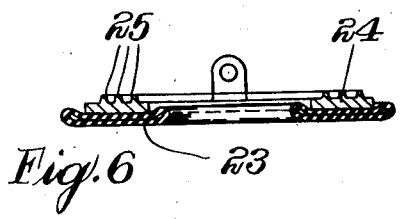
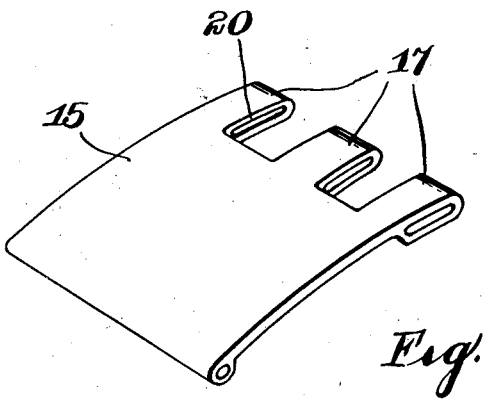
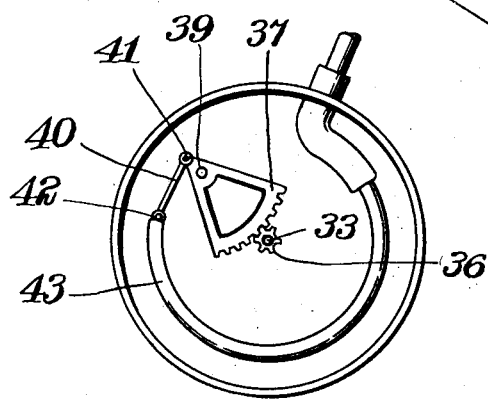

Patented Jan. 13, 1942

2,269,969

UNITED STATES PATENT OFFICE 2,269,969

SCALE

Charles E. Branick, Fargo, N. Dak.

Application January 5, 1939, Serial No. 249,422

9 Claims. (Cl. 265—47)

My invention relates to an improvement in scales and resides more specifically in a portable scale of the type used to measure the load on vehicle wheels. Because of the heavy trucks and trailers which have come into common usage in the past few years, it has become the practice for the road divisions of various State governments to provide means for weighing the load upon vehicle wheels and to limit the load which may be safely carried by any wheels or truck. Furthermore, in many instances, bridges and other road supports are unable to safely withstand the load of the heaviest of these trucks and trailers, and the load which these bridges and road supports can safely withstand must not be exceeded. In order to determine the weight upon any vehicle wheel it has been usual practical to provide portable scales which may be moved from one position to another as it has been found that if truck drivers driving extremely heavy loads know they are violating the law, they will often detour about a weighing station and would otherwise avoid being stopped. It has also been found that many tire concerns are equipping their plants with weighing devices so that they may note the weight of the vehicle upon which the tires are to be used and may recommend certain types of tires accordingly.

The common usage of weighing devices of this nature has been restricted to some extent because of the high price of these devices. It is therefore felt that there is a definite place on the market for a high grade accurate weighing device which is extremely simple in operation and which may be assembled or repaired in a minimum of time and with the least possible amount of effort. It is accordingly the object of the present invention to provide a low price scale which is extremely accurate but which may be sold for a low price.

It is a feature of my invention to provide a scale which utilizes a resilient tire or the like for the purpose of supporting the weight so that the variations in pressure due to weight upon this tire may be measured and the result calibrated in terms of the weight upon the tire. In other words, if the tire is filled with thirty pounds of air pressure, it has been found that when a vehicle or other heavy object is placed upon the tire, the pressure therein increases. The heavier the object placed upon the tire, the greater the pressure will increase. It is therefore only necessary to provide a means of measuring this variation in pressure to determine the weight resting upon the tire.

It is a feature of my invention to provide a scale which comprises a base upon which the operating elements may be assembled and to provide on this base a resilient tire to be filled with air or gas and to provide upon this tire a load bearing means which will cause the weight to be spread over a large area of the tire. This is important as it prevents the bulging or deformation of the tire at some pont more than at other points and prevents the injury of the tire by an extremely heavy weight.

It is a purpose of my invention to provide a scale embodying a resilient air cushion, a pressure distributing plate engageable with this air cushion, and a platform of a simple nature to support the vehicle being weighed and to transmit the downward pressure thereupon to the weight distributing plate. This means in combination with a simple device for measuring the tire pressure completes the device of the present invention.

It is a purpose of the present invention to utilize a circular tire in preferred form, which tire is preferably engaged by a weight distributing plate of such dimensions that even though the tire be pressed entirely flat, this plate will not pinch the portions of the tire at which the bend takes place. In other words, the bearing plate is narrower than the tire when the tire is flattened out, so that the edges of the tire will not be creased by the bearing plate.

These and other objects and novel features of my invention will be more clearly and fully set forth in the following specification and claims.

In the drawings forming a part of my specification:

Figure 4 is a top plan view of the pressure distributing plate used to engage the top of the air containing tire.

Figure 5 is a side elevation view of the load distributing plate illustrated in Figure 4.

Figure 6 is a cross-sectional view through the load bearing plate and through the tire beneath the same, this figure showing the tire completely deflated.

Figure 7 is a perspective view of one of the load bearing plates.

Figure 8 is a diagrammatic view showing one type of actuating means for transmitting the pressure within the tire to the indicating dial.

The weighing device A comprises a base plate 10 having oppositely disposed side flanges 11 and tapered end members 12. These end members 12 extend down in close proximity to the surface of the ground so that a vehicle wheel may be guided easily upon the scale A.

Figure 1:
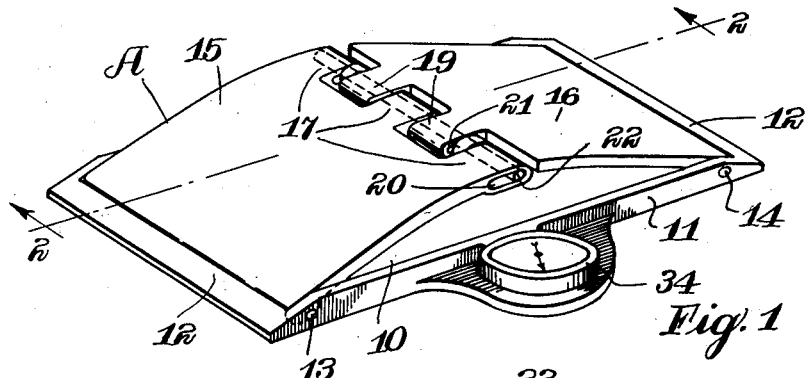
Figure 1 is a perspective view of my scale in readiness for operation.
Figure 2:
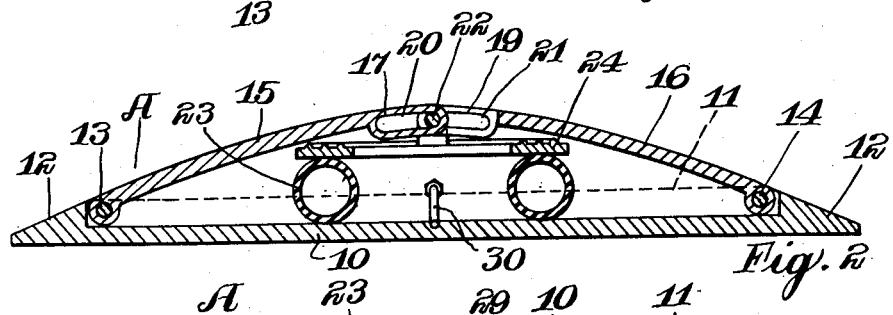
Figure 2 is a cross-sectional view longitudinally through the center of the scale, the portion of the section being indicated by the line 2—2 of Figure 1.
Figure 3:
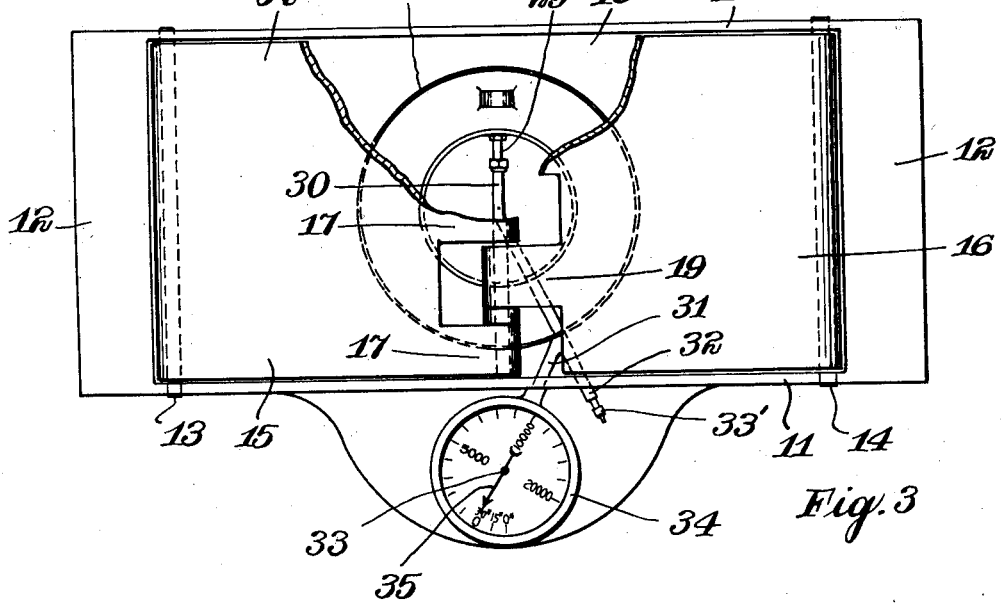
Figure 3 is a top plan view of my scale, portions of the platform plates having been broken away to disclose the construction therebeneath.

Pivoted between the side flanges 11 upon shafts 13 and 14, I provide platform plates 15 and 16. These plates interfit together, finger portions 17 of the plate 15 interlocking with fingers 19 on the plate 16. The fingers 17 and 19 are transversely slotted at 20 and 21, respectively, as will be best seen in Figures 2 and 7 of the drawings, and a connecting shaft 22 extends through the slots 20 and 21 to cononect the plates 15 and 16 together. When supported by the tire 23 in a manner which will be later described, the plates 15 and 16 are pivoted upwardly substantially into the position illustrated in Figures 1 and 2 of the drawings. However, when a heavy vehicle wheel rests upon the plates 15 or 16, or upon both of these plates, the plates pivot downwardly, placing pressure against the tire 23, the shaft 22 sliding in the grooves 20 and 21.

The pressure distributing plate 24 is best illustrated in Figures 4 and 5 of the drawings and is provided with circular reinforcing ribs 25 for increasing the strength of the plate without increasing the thickness thereof substantially, and is also provided with a pair of spaced aligned bearings 26 projecting upwardly from the upper surface of the bearing plate. The bearings 26 are drilled as shown at 27 in Figure 5 of the drawings, to accommodate the shaft 22 and the bearings 26 extend up between adjacent fingers 17 and 19 to engage this shaft 22. The tire 23 is preferably positioned immediately below the ring-like bearing plate 24.

The tire 23 is preferably of the single tube type commonly used on certain types of implements now manufactured. The valve stem 29 of the tire 23 is secured to a tubular pipe 30 which is preferably recessed in the base plate 10 and which branches into a pair of passages 31 and 32 near the opposite end thereof. A valve, not illustrated but of the type commonly used in automobile tires, is placed in the passage 32 and this passage is closed by the usual type of valve cap 33'. The passage 31 communicates with the pressure indicator 34 by means of which the weight upon the platform plates 15 and 16 may be readily determined.

The pressure plate 24 is preferably narrower than the tire 23 when the same is deflated as illustrated in Figure 6 of the drawings. It will be noted that the points of fold of the tire 23 are not engaged by the weight distributing or pressure plate 24, even though the tire 23 is entirely deflated. Thus no injury to the tire will occur even though air be expelled entirely from the tire 23. The pressure indicator 34 may be of any desired type. In the form shown, the indicator 34 is provided with an indicating hand 35 mounted on a central shaft 33. Within the casing of the indicator 34, the shaft 33 is provided with a pinion 36 which engages the teeth of a gear segment 37 pivoted at 39. A link 40 is pivoted at one end 41 to the gear segment 37 at a point spaced from the pivot 39 and is connected pivotally at the other end 42 to an arcuated pressure element 43. When the pressure within the tire 23 and accordingly within the pressure element 43 is increased or decreased, the radius of curvature of the element 43 changes, thus moving the link 40 which pivots the gear segment 37, which in turn rotates the pinion 36 and the shaft 33 upon which the pointer 35 is mounted.

The manner in which the present scale may be assembled is believed obvious from an observation of the drawings. The tire 23 is placed upon the base 10 and the stem 29 thereof is connected by the passages 30 and 31 to the indicator 34. The load distributing plate 24 is placed upon the tire and the plates 15 and 16 are placed upon the base, the shafts 13 and 14 being inserted into place to pivotally mount the same. The shaft 22 is then put in position in the slots 20 and 21 and in openings 27 of bearings 26, connecting the plates 15 and 16 together. The cap 33' in the passage 32 is then removed, and by means of a pump or any suitable source of air supply, the tire 23 is inflated to some initial pressure, such as for example, thirty pounds of pressure.

The indicator 34 is then calibrated properly so that a weight of five thousand pounds upon the plates 15 and 16 will increase the pressure within the tire 23 sufficiently to rotate the indicator pointer 35 to indicate five thousand pounds on the indicator 34. This calibration is continued until the proper positions for the various weight indications are found. The scale may then be used in the usual manner, the vehicle wheel being rolled upon the plates 15 and 16 until it rests in substantially the center above the shaft 22 anad so that the weight of the vehicle wheel presses the weight distributing plate firmly against the tire 23. The weight upon the plates will then be registered upon the indicator 34.

In accordance with the patent statutes I have described the principles of construction and operation of my scale, and while I have endeavored to set forth the best embodiments thereof, I desire to have it understood that this is only illustrative of a means of carrying out my invention and that obvious changes may be made without departing from the spirit of my invention.

I claim:

1. A scale comprising a base, a hollow ring-shaped endless tire lying flat upon said base with its axis vertical, a pressure plate supported above said tire to distribute the pressure thereupon, and indicator means connected to said tire to indicate the weight of an object depressing said pressure distributing plate.

2. A scale comprising an air containing hollow ring-shaped endless tire arranged upon its side, an indicator gauge operatively connected thereto to indicate the air pressure therein, and weight supporting means upon the side of said tire contacting the tire annularly to distribute pressure onto the same.

3. A scale comprising a base, a hollow ring-shaped endless tire arranged with one side resting upon said base with the axis thereof vertical, a weight supporting plate mounted movably with respect to said base bearing against the other side of said tire about a circular area, an indicator for indicating the air pressure within said tire, and valve means to permit the introduction of air into said tire.

4. A scale comprising a base, a pair of load supporting plates substantially horizontally pivotally secured to said base to pivot toward or away from said base, a tire interposed between said plates and said base supported in a manner to be compressed by downward pivoting of said plates, and an indicator operatively connected to the interior of said tire to indicate variations of pressure therein.

5. A scale comprising a base, a plate pivoted adjacent each end of said base, means slidably and pivotally connecting adjacent ends of said plates together, a load distributing plate pivoted to said connecting means, a tire interposed between said load distributing plate and said base, and a tire pressure indicator connected to said tire.

6. A scale comprising a base having beveled ends, a plate pivotally connected adjacent each end and forming substantially a continuation of said bevel, means slidably and pivotally connecting adjacent ends of said plates centrally of said base to permit said plates to pivot downwardly at the center of said base, a pneumatic tire interposed between said plates and said base, and an air tire pressure indicator connected to said tire.

7. A scale comprising a base, a pair of plates pivoted along parallel axes to said base, interlocking fingers on adjacent ends of said plates, means connecting said interlocking fingers to permit downward pivoting of said plates towards said base, a pneumatic tire interposed between said plates and said base, and a tire pressure indicator connected to said tire.

8. A scale comprising a base, a pair of plates pivoted thereto, and having ends pivotally movable toward, or away from, said base, a weight distributing plate mounted beneath said ends of said plates and in engagement therewith, so that weight on said plates tending to pivot said plates to move said ends toward said base will be transferred to said distributing plate, a tire interposed between said distributing plate and said base, and an air tire pressure indicator connected to said tire.

9. A scale comprising a base, a pair of oppositely disposed flanges extending upwardly from said base, a plate connected adjacent one end to one of said flanges adjacent one end of said base, a second plate secured adjacent one end to the other of said flanges, means connecting adjacent ends of said plates together, said connections being of a type to permit downward pivoting of said plates at substantially the center of said base, a pneumatic tire interposed between said plates and said base, and a tire pressure indicator connected to said tire.

CHARLES E. BRANICK.